Oct. 7, 1947.  C. N. RICHARDSON  2,428,584
LIQUID ELECTRODE ELECTROLYTIC CELL
Filed July 22, 1944
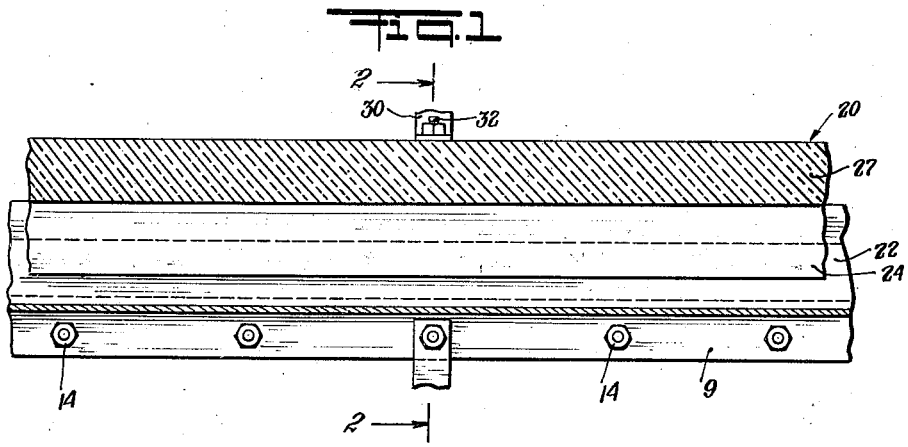
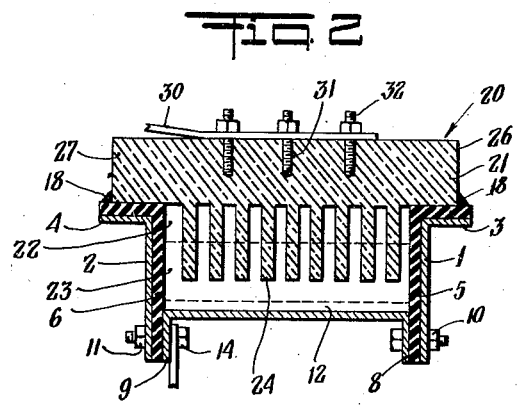
INVENTOR
Chester N. Richardson
BY
Pennie, Davis, Marvin + Edmonds
ATTORNEYS Patented Oct. 7, 1947

2,428,584

UNITED STATES PATENT OFFICE 2,428,584

LIQUID ELECTRODE ELECTROLYTIC CELL

Chester N. Richardson, Youngstown, N. Y., assignor to The Mathieson Alkali Works, Inc., New York, N. Y., a corporation of Virginia Application July 22, 1944, Serial No. 546,156

1 Claim. (Cl. 204—250)

My invention is concerned with cells using mercury cathodes for the electrolysis of aqueous solutions of alkali-metal salts, such as sodium chloride, and aims to provide certain improvements in the anodes, anode cover and electrical connections to the anodes of such cells. It is a particular object of my invention to provide a combination anode and cover of graphite which is of simple and rugged construction, readily adjustable to compensate for wear and which protects the metallic connections to the anodes from the anodic gas.

In cells for the electrolysis of sodium chloride, the metallic electrical conductors must be kept out of contact with the liberated chlorine. Various arrangements have been suggested to protect the metallic conductors but these have not been adequately effective because of power loss due to excessive length of the metallic conductors within the cell structure or the use of high resistance graphite connections. Keeping the conductors out of contact with the chlorine gas has been complicated by the necessity for periodic adjustments of the anodes resulting from the wearing away of the graphite. My invention overcomes disadvantages incident to conductor arrangements and adjusting means for the anodes heretofore proposed by providing a specially constructed and proportioned integral anode-cover combination formed of graphite together with exterior conductor attaching means.

In a preferred and advantageous embodiment of my invention, the anode-cover is formed of a single body of graphite, the cover portion being supported by the side walls of the cell and forming an enclosed space above the salt solution for receiving the chlorine gas, and depending anode portions in the form of fins or tips integral with the cover providing a large active anodic surface in the solution. While the anode-cover of my invention has general utility, it is especially adaptable to long narrow cells such as the cell illustrated in my United States Patent No. 2,334,354.

One important feature of my invention is the relatively thick cover extending laterally beyond the anode portions and across the side-walls of the cell. As the depending anode portions are corroded away and thus shortened, the lateral extensions of the cover are reduced in thickness by milling off the under side to lower the anode portions and thus to restore the proper distance between the anode portions and the cathode. Moreover, this thick cover facilitates the attachment of the electrical conductors as described below and aids in suppressing diffusion of chlorine gas through the cover. Another important feature of my invention is the means for attaching the metallic electrical conductor to the integral anode-cover. At a suitable place on the exterior of the cover above the anode portions and not above the lateral extensions to be reduced in thickness during service, the cover is for example drilled and tapped to receive connecting means, such as studs, for attaching the metallic conductors. The holes enter the cover only a short distance, leaving a very appreciable depth of graphite between the studs and the inside of the cover which is exposed to the chlorine gas. It is essential that a substantial depth of graphite be left below the inner ends of such studs to protect the metal from the chlorine gas.

These and other novel features of my invention will be readily understood from the following description, taken in conjunction with the accompanying drawings, of one embodiment of my invention, in which:

Fig. 1 is a sectional elevational view of a portion of an electrolytic cell embodying my invention; and Fig. 2 is a view along line 2—2 of Fig. 1.

The cell illustrated in the drawings is of the type comprising an anode compartment with a mercury cathode which forms an amalgam with sodium liberated by electrolysis and a cathode compartment (not shown) for the conversion of the sodium to sodium hydroxide. The cell comprises metal side walls 1 and 2 usually of steel with outwardly extending flanges 3 and 4 at the top. The sides and top of the flanges are lined with an electrical insulating material 5 and 6 in the form of layers of rubber cemented or otherwise bonded to the steel. The sides are connected together at the bottom by an inverted steel channel 7 having depending sides 8 and 9 attached by bolts 10 and 11 to the sides. The layers of rubber are interposed between the sides and the steel channel 7 and the layer of mercury 12, forming the cathode of the cell, rests upon the channel bottom but is not in electrical contact with the steel sides. The cathode conductor 13 is connected to the side 9 of the bottom by the bolt 14.

The integral anode-cover 20 of my invention is cut out of a single body of graphite and comprises a horizontal flat cover 21 which spans the space between the sides and rests upon the rubber lining of the flanges 3 and 4. The cover is luted at 18 in the usual way and encloses the top of the cell forming the chamber 22 for receiving the chlorine gas liberated from sodium chloride solution 23. A plurality of anode fins 24, integral with the cover, dip into the solution. The anode portions may be formed, for example, by milling out slots to leave fins 24 having a large cathodic surface. The anode-cover may be built up of a series of slabs of graphite cemented together with an appropriate chlorine-impervious cement. The outside of the combination anode-cover may also be painted as a complete barrier to diffusion of chlorine gas through the graphite.

It is important that the proper spacing be maintained between the lower extremities of the anode portions and the layer of amalgam to prevent excessive resistance and power loss. As the anodes wear away, the power loss increases, but my invention provides for periodic compensating adjustments avoiding such losses. The cover being made sufficiently thick, the under sides of the lateral extensions 26 and 27 which rest on the flanges 3 and 4 are machined off from time to time to lower the anode fins to the proper distance from the amalgam.

The combination anode-cover of my invention, applied to a cell such as that illustrated, may be made of graphite slabs 12" or more thick, long enough to extend at least 2" over each side-wall, and the wider the better to reduce the number of joints along the cell. After milling anode fins depending say 5½" from the cover in such slabs the cover, including the lateral extensions before any undercutting as described, would be somewhat more than 6" thick. The foregoing dimensions are given by way of example. Thicker and wider slabs can be used with advantage.

Another important feature of my invention is the attachment of the metallic (usually copper) electrical conductor 30 to the integral graphite anode-cover. A plurality of holes 31 are drilled a relatively short distance into the thick cover and tapped to receive the studs 32 by which the conductors are secured to the cover. There is a sufficient depth of graphite between the bottom of the holes 31 and the chamber to protect the metal. The central connection of the conductors to the combination anode-covers and the integral construction of the anode-covers also reduces resistance and consequently power loss.

I claim:

A cell for the electrolysis of salt solutions comprising a bottom for supporting a layer of amalgam to act as the cathode of the cell, side walls for confining a salt solution above the amalgam, said side walls having outwardly-extending horizontal flanges at their upper edges, a layer of resilient insulating material on the inside of said side walls and on the top of said flanges, a combination graphite anode-cover having a relatively thick cover portion arranged with lateral extensions resting upon the layer of resilient insulating material on the outwardly-extending flanges of said side walls, said anode-cover closing an anodic chamber above the solution, a plurality of depending anode portions integral with the anode-cover and arranged to dip into the solution, said anode-cover being so thick that the under side of the lateral extensions may be machined off from time to time to lower the anode portions into the salt solution and thus to maintain the proper spacing with respect to the amalgam cathode, an electrical metallic conductor for supplying current to the anode-cover and through it to the integral anode portions, the cover having at least one hole in the exterior thereof for receiving a conductor-connecting means, said hole being above the anode portions and so shallow that a substantial thickness of graphite is retained between the bottom of the hole and the under side of the anode-cover, and conductor-connecting means in the hole attaching the conductor to the anode-cover.

CHESTER N. RICHARDSON.

REFERENCES CITED

The following references are of record in the file of this patent:

UNITED STATES PATENTS

| Number | Name | Date |
|---|---|---|
| 2,104,677 | Sorenson | Jan. 4, 1938 |
| 468,880 | Le Sueur | Feb. 16, 1892 |
| 2,328,665 | Munson | Sept. 7, 1943 |
| 1,145,593 | Jewell | July 6, 1915 |
| 1,612,361 | Creighton | Dec. 28, 1926 |
| 2,334,354 | Richardson | Nov. 16, 1943 |